March 9, 1965     G. BANDINI     3,172,679
VEHICLE FOR THE CULTIVATION OF MARKET PRODUCE, PARTICULARLY
FOR THE PICKING OF STRAWBERRIES
Filed Dec. 18, 1961
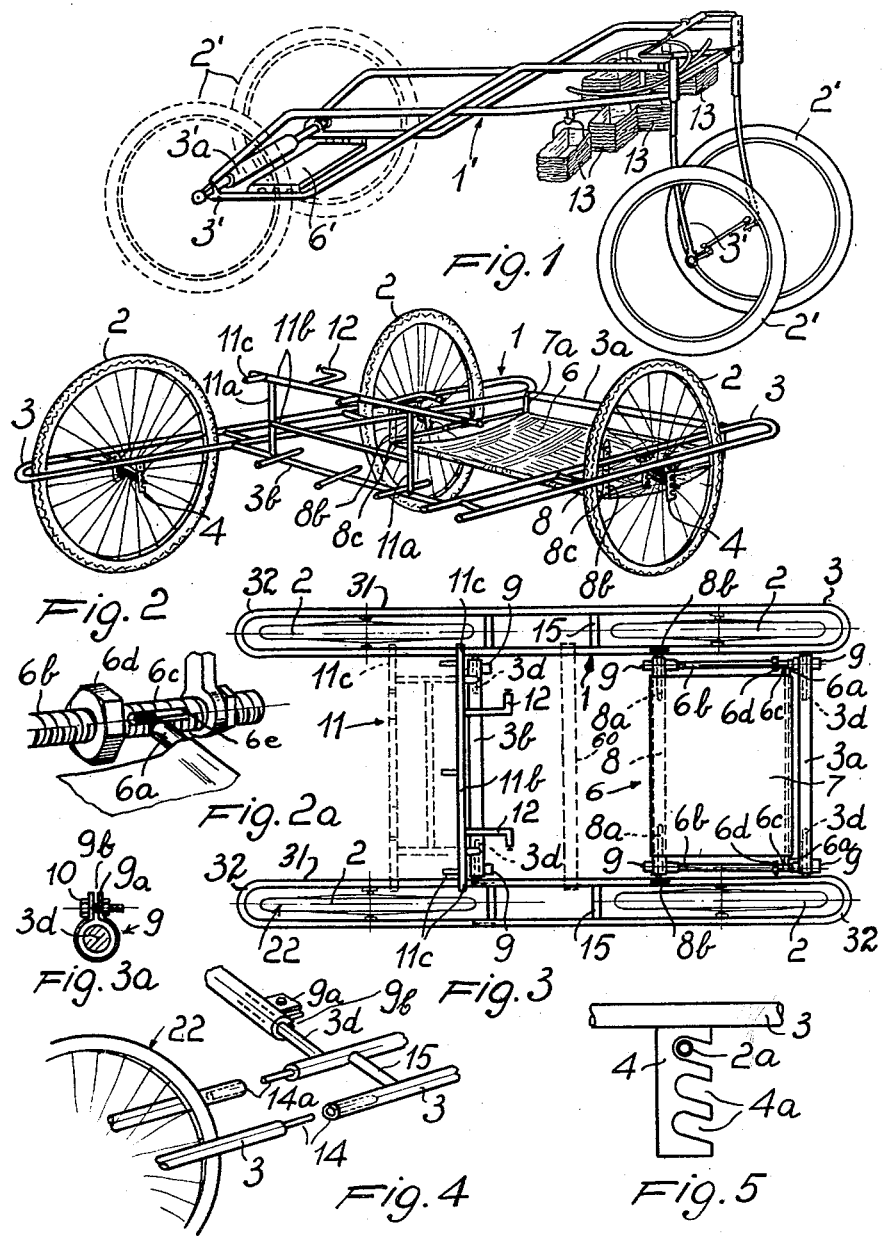
Giuseppe Bandini
INVENTOR.
BY [signature]
Agent 3,172,679
VEHICLE FOR THE CULTIVATION OF MARKET
PRODUCE, PARTICULARLY FOR THE PICKING
OF STRAWBERRIES
Giuseppe Bandini, Imola, Italy
(% Dr. G. Modiano, Via Meravigli 16, Milan, Italy)
Filed Dec. 18, 1961, Ser. No. 160,225
Claims priority, application Italy, Dec. 23, 1960, 641,856
1 Claim. (Cl. 280—32.5)

The subject of the present invention is a vehicle with seat, for the cultivation of market garden produce in general, transplanting, thinning out and similar operations, and in particular for the picking of strawberries.

It is known that most of the jobs involved in cultivating market garden produce are carried out in a kneeling position or in extremely awkward postures.

This means that the work is done with greater fatigue and less efficiency on the part of the worker.

An object of the invention is to avoid and eliminate in the main the aforesaid inconveniences by devising an economic vehicle provided with a seat, substantially adapted for carrying out said jobs from a seated position.

This vehicle is characterized in that it comprises a frame mounted on at least three wheels, an adjustable seat mounted on the frame, means for hooking baskets and means for the loading of packing material and for the support of tools and similar objects.

The frame may with advantage comprise a plurality of parts linked together by adjustable and removable spacing and connecting means provided with locking means and adapted to enable the track or gauge of the vehicle to be chosen according to the width of the rows of the particular produce being cultivated.

It has been found in practice that the invention acquires a particular significance when, according to the present invention, the seat is provided with its own small frame mounted on the main frame through hinge means and by means of brackets to which the seat is hooked in a removable fashion. The frame members of the vehicle are provided with engaging means for either rigid or movable connection with one another through counter-means formed thereon. Such counter-means are in particular formed on the small seat frame. At least one wheel bearing fork may be removably attached to the main frame. The means for hooking baskets and the like are mounted laterally and are outwardly projecting from a supporting member which is made in the form of a small tipping frame pivotally mounted on the main frame substantially through hinge means and suitable as an overturnable loading platform. The main frame extends substantially in a single plane and the means of attachment to the wheels are substantially U-shaped each engaging both ends of the axle of its own wheel.

Further characteristics and advantages of the invention will appear more fully from two preferred but not exclusive embodiments of a vehicle with seat, for the cultivation of market garden produce, according to the invention, which is shown, purely for illustrative purposes without limiting the invention, in the accompanying drawing wherein:

FIG. 1 shows a perspective view of the vehicle according to a first embodiment of the invention;

FIG. 2 shows a perspective view of the vehicle according to another embodiment of the invention, with three wheels only;

FIG. 2a shows an enlarged perspective view of a detail;

FIG. 3 shows a plan of the vehicle of FIG. 2, to which a fourth wheel has been fitted by means of a removable fork;

FIG. 3a shows an enlarged detail of the head of a connecting spacer member;

FIG. 4 shows a detail of FIG. 3 in perspective and on a somewhat enlarged scale, referred to the point of the junction of the removable fork to the main frame;

FIG. 5 shows an enlarged detail of FIG. 2 referring to a bracket partially engaging an axle of a wheel.

Main frame 1 has forks 3 or 3' which may be inclined or vertical as shown in the embodiment of FIG. 1 or substantially horizontal, as shown in the embodiment of FIGS. 2–5. Frame 1 is supported by wheels 2 or 2' through supporting engagement between axles of wheels 2 and forks 3. In the embodiment shown in FIG. 2, rigidly secured on the horizontal forks 3 are vertical lugs 4 provided with a plurality of notches 4a wherein the axles 2a (FIG. 5) of wheels 2 are removably inserted. Frame 1 rests on the axles 2a of wheels 2 through lugs 4, the plurality of notches thereby allowing the axles 2a to be inserted in notches of higher or lower level so as to obtain an adjustment of the relative position between the frame and the wheels. The forks 3 constitute lateral frame parts, each in the form of an elongated ring with straight ring portions 31 and arcuated ring portions 32 connecting the straight ring portions 31. The vehicle further comprises a seat 6 mounted on the main frame. In the embodiment shown in FIG. 2 the seat is provided with a rod 6a for stretching a cloth 7, which rod is in itself slidably supported at its ends on two guides 6b having threaded portions 6c with longitudinal notches 6e slidably receiving the ends of rods 6a, said threaded portions engaging with nuts 6d acting on said sliding rod. Other parts of the seat are a tubular member 8 receiving at its ends studs 8a (member 8 and its studs are shown in FIG. 3 by broken lines) supported by upright brackets 8b (FIGURES 2 and 3) which are removably secured on the main frame and are formed with holes 8c into which the studs firmly fit and are locked therein by non-represented locking means. The seat is further secured to the main frame by means of other upright brackets 7a (FIG. 2) similar to brackets 8b and removably fastened to a tubular member 3a (visible in FIG. 3) connecting the forks 3 to one another. Inside the ends of the member 3a and those of a second member 3b similar to the first there are received tubular studs 3d (shown by broken lines) belonging to the forks (FIG. 3 and in part FIG. 4). As can be seen, said members 3a and 3b constitute links between the right hand and the left hand parts of the vehicle through telescopic couplings obtained from members 3a, 3b and studs 3d. The locking means for fixing in position the aforesaid members are in the form of clamps 9 situated on at least one of the terminal parts of the outer body part (3a or 3d) of each of said telescopic couplings. At the ends of each individual tubular member 3a or 3b receiving studs 3d, there are formed longitudinal cuts 9b and ears 9a held tight by bolts 10 and constituting the said clamps 9.

It will be understood that some at least of the means so far described are designed to enable the seat to be tilted and to give stability to the same.

On the main frame there is mounted a small tipping frame 11 for loading, whose supporting uprights or connecting members 11a are rigidly fastened to member or rotatable bar 3b which, as stated hereinabove, is adapted to rotate and to be locked around studs or pins 3d. In addition small frame 11 has further members 11b with outwardly projecting hooks 12 welded thereon for suspending thereon baskets 13 (shown for example in FIG. 1 only), whilst on part of said cross members there are projections 11c forming means for the support of the tipping body 11 on the forks 3 of the vehicle, and in FIG. 3 there is in fact indicated with broken lines the turned over position of said small frame 11. Finally the vehicle according to FIGURES 2 to 5 possesses a removable spare wheel, indicated both by the numeral 22 and the numeral 2 to distinguish the same from other wheels 2.

Wheel 22 engages with the main frame by means of its own fork through groove and tongue couplings 14 and 14a which are preferably of the snap bayonet type.

There are also small stiffening cross-pieces 15 disposed between the members of the forks.

The vehicle may easily be moved when the user is sitting on the seat and suitably pushes with the feet on the ground. The hands thus remain free for the desired operations.

It will be understood that the vehicle frame is constituted of assembling rod members which are telescopically connected one with the other so that the dimensions of the vehicle may be changed at wish within limits. Furthermore, due to the inventive rod members, the vehicle is very light and may be completely disassembled allowing an easy transportation. The telescopic connection of the rod members is obtained through a removable mortise-and-tenon like joint type, wherein the mortise-and-tenon elements are of substantial extension and have circular cross-sections to allow rotation about their axes. Such a pivotal and extensible mortise-and-tenon connection allows also the swiveling of at least a pair of wheels as shown in FIG. 1, so that a steering of such wheels may be easily carried out.

The invention thus conceived is susceptible to numerous variants and modifications all coming within the scope of the inventive concept.

Thus, for example, a band 60 (FIG. 3) shown in dotted lines can be fitted to the vehicle frame for the purpose of allowing the chest to be rested thereon during working.

I claim:

A vehicle for the cultivation of market garden produce having a substantially quadrangular frame comprising, a first lateral frame part at one side of said quadrangular frame, a second lateral frame part at the opposite side of said quadrangular frame, each of said lateral frame parts being constituted by an elongated ring having in a horizontal plane two parallel spaced straight ring portions extending over the entire length of said quadrangular frame and arcuated ring portions connecting the ends of said straight ring portions and at least one cross stiffening element connecting said straight ring portions intermediate their ends, two wheels near said arcuated ring portions and between said straight ring portions in each of said frame parts, said wheels having pins allowing rotation of the wheels thereabout, pin supporting lugs fixed on said straight ring portions for adjustably supporting the pins of said wheels, a seat between said first and said second lateral frame parts near the extremities thereof, said seat including a first transverse rod fixed with its ends on said straight ring portions of said first and said second lateral frame parts, a second transverse rod spaced from said first transverse rod and having engaging pins on its ends, a threaded guide with a longitudinally extending elongated notch therein for slidably receiving said engaging pins therein fixed on one of said straight ring portions of each of said lateral frame parts, nut means screwed on said threaded guides for providing stops for said engaging pins, a cloth fixed with one end thereof on said first transverse rod and with the other end thereof on said second transverse rod, a load carrying frame spaced from said seat and including a rotatable bar, pivot means on said straight ring portions for rotatably supporting said rotatable bar, said load carrying frame having at least one further bar parallel to said rotatable bar and connecting members connecting said rotatable and said further bar, said further bar having end portions transversely extending over at least one of said straight ring portions to limit rotation of said load carrying frame, said load carrying frame being spaced from said seat to provide a completely free space between said seat and said load carrying frame allowing at least the feet and the hands of a human sitting on said seat to pass through said free space and to reach the ground, groove and tongue means in said straight ring portions of at least one lateral frame part in an intermediate position between said supporting lugs of said one lateral frame part to allow a detachable assembling of the components of said one lateral frame part.

References Cited in the file of this patent

UNITED STATES PATENTS

| | | |
|---|---|---|
| 667,370 | Sowder | Feb. 5, 1901 |
| 1,258,776 | Jenkins | Mar. 12, 1918 |
| 1,745,562 | Taicher | Feb. 4, 1930 |
| 2,317,606 | Harris | Apr. 27, 1943 |
| 2,729,196 | Breitenbach | Jan. 3, 1956 |
| 3,032,368 | Sigler et al. | May 1, 1962 |